(12) United States Patent
Duan et al.

(10) Patent No.: US 12,314,154 B2
(45) Date of Patent: May 27, 2025

(54) CODE EXECUTION TRACE GENERATION WITH PRE-TRAINED LARGE LANGUAGE MODEL

(71) Applicant: MICROSOFT TECHNOLOGY LICENSING, LLC., Redmond, WA (US)

(72) Inventors: Nan Duan, Beijing (CN); Shengyu Fu, Redmond, WA (US); Shuai Lu, Beijing (CN); Neelakantan Sundaresan, Bellevue, WA (US); Alexey Svyatkovskiy, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 114 days.

(21) Appl. No.: 18/138,330

(22) Filed: Apr. 24, 2023

(65) Prior Publication Data

US 2024/0354222 A1 Oct. 24, 2024

(51) Int. Cl.
*G06F 11/362* (2025.01)
*G06N 3/08* (2023.01)
*G06N 20/00* (2019.01)

(52) U.S. Cl.
CPC .......... *G06F 11/3636* (2013.01); *G06N 3/08* (2013.01); *G06N 20/00* (2019.01)

(58) Field of Classification Search
CPC ....... G06F 11/3636; G06N 20/00; G06N 3/08
See application file for complete search history.

(56) References Cited

U.S. PATENT DOCUMENTS

2023/0418596 A1* 12/2023 Karakos ............... G06F 21/577

FOREIGN PATENT DOCUMENTS

WO WO-2020149897 A1 * 7/2020 ............... G06F 8/36

OTHER PUBLICATIONS

Amini, et al., "MathQA: Towards Interpretable Math Word Problem Solving with Operation-Based Formalisms", In Proceedings of NAACL-HLT, Jun. 2, 2019, pp. 2357-2367.
Austin, et al., "Program Synthesis with Large Language Models", In repository of arXiv:2108.07732v1, Aug. 16, 2021, 34 Pages.
Bengio, et al., "Curriculum Learning", In Proceedings of the 26th Annual International Conference on Machine Learning, Jun. 14, 2009, pp. 41-48.
Bieber, et al., "Learning to Execute Programs with Instruction Pointer Attention Graph Neural Networks", In Proceedings of the 34th Conference on Neural Information Processing Systems, Dec. 6, 2020, 12 Pages.

(Continued)

*Primary Examiner* — Geoffrey R St Leger

(57) ABSTRACT

A large language model, previously pre-trained on multiple source code modeling tasks, is pre-trained, through curriculum learning, to learn to predict a code execution trace given a source code program. The model is pre-trained using a variety of pre-training datasets consisting of pairs of a source code sample and a corresponding execution trace. The curriculum pre-training starts with a pre-training dataset of single line executions and adds in additional pre-training datasets with more increasing complex behaviors. The pre-training datasets include mutation-augmented source code samples and their corresponding execution traces.

18 Claims, 8 Drawing Sheets

(56) References Cited

OTHER PUBLICATIONS

Casalnuovo, et al., "A Theory of Dual Channel Constraints", In Proceedings of the ACM/IEEE 42nd International Conference on Software Engineering: New Ideas and Emerging Results, May 23, 2020, pp. 25-28.
Chakraborty, et al., "NatGen: Generative Pre-training by "Naturalizing" Source Code", In Proceedings of the 30th ACM Joint European Software Engineering Conference and Symposium on the Foundations of Software Engineering, Nov. 14, 2022, pp. 18-30.
Chen, et al., "Evaluating Large Language Models Trained on Code", In Repository of arXiv:2107.03374v1, Jul. 7, 2021, 35 Pages.
Cobbe, et al., "Training verifiers to solve math word problems", In Repository of arXiv:2110.14168v1, Oct. 27, 2021, 22 Pages.
Dehghani, et al., "Universal Transformers", In Proceedings of the International Conference on Learning Representations, May 6, 2019, 23 Pages.
Derezińska, et al., "Operators for mutation testing of python programs", In Research Report of Warsaw University of Technology, Feb. 2014, 19 Pages.
Devlin, et al., "BERT: Pre-training of Deep Bidirectional Transformers for Language Understanding", In Proceedings pf Conference of the North American Chapter of the Association for Computational Linguistics: Human Language Technologies, Jun. 2, 2019, pp. 4171-4186.
Dong, et al., "Unified Language Model Pre-training for Natural Language Understanding and Generation", In Proceedings of 32nd Annual Conference on Neural Information Processing Systems, Dec. 8, 2019, 13 Pages.
Feng, et al., "CodeBERT: A Pre-Trained Model for Programming and Natural Languages", In Proceedings of Findings of the Association for Computational Linguistics, Nov. 16, 2020, pp. 1536-1547.
Graves, et al., "Hybrid computing using a neural network with dynamic external memory", In Journal of Nature, vol. 538, Issue 7626, Oct. 27, 2016, 21 Pages.
Graves, et al., "Neural Turing Machines", In The Repository of arXiv:1410.5401v2, Dec. 10, 2014, 26 Pages.
Guo, et al., "Graphcodebert: Pre-Training Code Representations with Data Flow", In Proceedings of 9th International Conference on Learning Representations, May 3, 2021, 18 Pages.
Guo, et al., "UniXcoder: Unified Cross-Modal Pre-training for Code Representation", In Proceedings of the 60th Annual Meeting of the Association for Computational Linguistics, May 22, 2022, pp. 7212-7225.
Hamlet, Richardg., "Testing Programs with the Aid of a Compiler", In Journal of IEEE Transaction on Software Engreening, vol. 3, Issue 4, Jul. 1977, pp. 279-290.
Hendrycks, et al., "Measuring Mathematical Problem Solving With the MATH Dataset", In Proceedings of the 35th Conference on Neural Information Processing Systems, Dec. 2021, 11 Pages.
Henighan, et al., "Scaling Laws for Autoregressive Generative Modeling", In Repository of arXiv:2010.14701v1, Oct. 28, 2020, 35 Pages.
Hindle, et al., "On the Naturalness of Software", In Proceedings of the 34th International Conference on Software Engineering, Jun. 2, 2012, pp. 837-847.
Jia, et al., "An Analysis and Survey of the Development of Mutation Testing", In Journal of IEEE Transaction on Software Engreening, vol. 37, Issue 5, Jun. 17, 2010, pp. 649-678.
Kaiser, et al., "Neural GPUs Learn Algorithms", In Proceedings of the 4th International Conference on Learning Representations, May 2, 2016, 9 Pages.
Kanade, et al., "Learning and Evaluating Contextual Embedding of Source Code", In Proceedings of the 37th International Conference on Machine Learning, Jul. 13, 2020, 21 Pages.
Kurach, et al., "Neural Random-Access Machines", In Repository of arXiv:1511.06392v2, Jan. 7, 2016, 17 Pages.
Ling, et al., "Program Induction by Rationale Generation: Learning to Solve and Explain Algebraic Word Problems", In Proceedings of the 55th Annual Meeting of the Association for Computational Linguistics, Jul. 30, 2017, pp. 158-167.
Lu, et al., "Pretrained Transformers As Universal Computation Engines", In Repository of arXiv:2103.05247v1, Mar. 9, 2021, 19 Pages.
Nye, et al., "Show Your Work: Scratchpads For Intermedi Ate Computation With Language Mode", In Repository of arXiv:2112.00114v1, Nov. 30, 2021, 16 Pages.
Puri, et al., "CodeNet: A Large-Scale AI for Code Dataset for Learning a Diversity of Coding Tasks", In Proceedings of the 35th Conference on Neural Information Processing Systems Track on Datasets and Benchmarks, Dec. 2021, 13 Pages.
Radford, et al., "Improving Language Understanding by Generative Pre-Training", Retrieved From: https://www.cs.ubc.ca/~amuham01/LING530/papers/radford2018improving.pdf, 2018, 12 Pages.
Radford, et al., "Language Models are Unsupervised Multitask Learners", In Journal of OpenAI blog, vol. 1, Issue 8, Feb. 24, 2019, 24 Pages.
Raffel, et al., "Exploring the Limits of Transfer Learning with a Unified Text-to-Text Transformer", In Journal of Machine Learning Research, vol. 21, Issue 1, Jun. 20, 67 Pages.
Reed, "Neural Programmer-Interpreters", In Repository of arXiv:1511.06279v4, Feb. 29, 2016, 13 Pages.
Saxton, et al., "Analysing Mathematical Reasoning Abilities of Neural Models", In Proceedings of the 7th International Conference on Learning Representations, May 6, 2019, 17 Pages.
Svyatkovskiy, et al., "IntelliCode Compose: Code Generation using Transformer", In Proceedings of the 28th ACM Joint European Software Engineering Conference and Symposium on the Foundations of Software Engineering, Nov. 8, 2020, pp. 1433-1443.
Tay, et al., "Efficient Transformers: A Survey", In Journal of ACM Computing Surveys, vol. 55, Issue 6, Dec. 7, 2022, 28 Pages.
Tay, et al., "Long Range Arena : A Benchmark for Efficient Transformers", In Proceedings of the 9th International Conference on Learning Representations, May 3, 2021, 19 Pages.
Vaswani, et al., "Attention is All You Need", In Proceedings of Advances in Neural Information Processing Systems, vol. 30, Dec. 4, 2017, 11 Pages.
Velickovic, et al., "Pointer Graph Networks", In Proceedings of the 34th Conference on Neural Information Processing Systems, Dec. 6, 2020, 13 Pages.
Veličković, et al., "Neural Execution of Graph Algorithms", In Proceedings of the 8th International Conference on earning Representations, Apr. 26, 2020, 14 Pages.
Wang, et al., "CodeT5: Identifier-aware Unified Pre-trained Encoder-Decoder Models for Code Understanding and Generation", In Proceedings of the 2021 Conference on Empirical Methods in Natural Language Processing, Nov. 7, 2021, pp. 8696-8708.
Wang, et al., "Learning Semantic Program Embeddings with Graph Interval Neural Network", In Proceedings of the ACM on Programming Languages, vol. 4, Issue OOPSLA, Nov. 13, 2020, 27 Pages.
Wang, et al., "Syncobert: Syntax-Guided Multi-Modal Contrastive Pre-Training for Code Representation", In Repository of arXiv:2108.04556v3, Sep. 9, 2021, 9 Pages.
Yan, et al., "Neural Execution Engines: Learning to Execute Subroutines", In Proceedings of the 34th Conference on Neural Information Processing Systems, Dec. 6, 2020, 11 Pages.
Zaremba, et al., "Learning to Execute", In Repository of arXiv:1410.4615v1, Oct. 17, 2014, 8 Pages.
Zhou, et al., "Teaching Algorithmic Reasoning via In-context Learning", In Repository of arXiv:2211.09066v1, Nov. 15, 2022, 37 Pages.

* cited by examiner

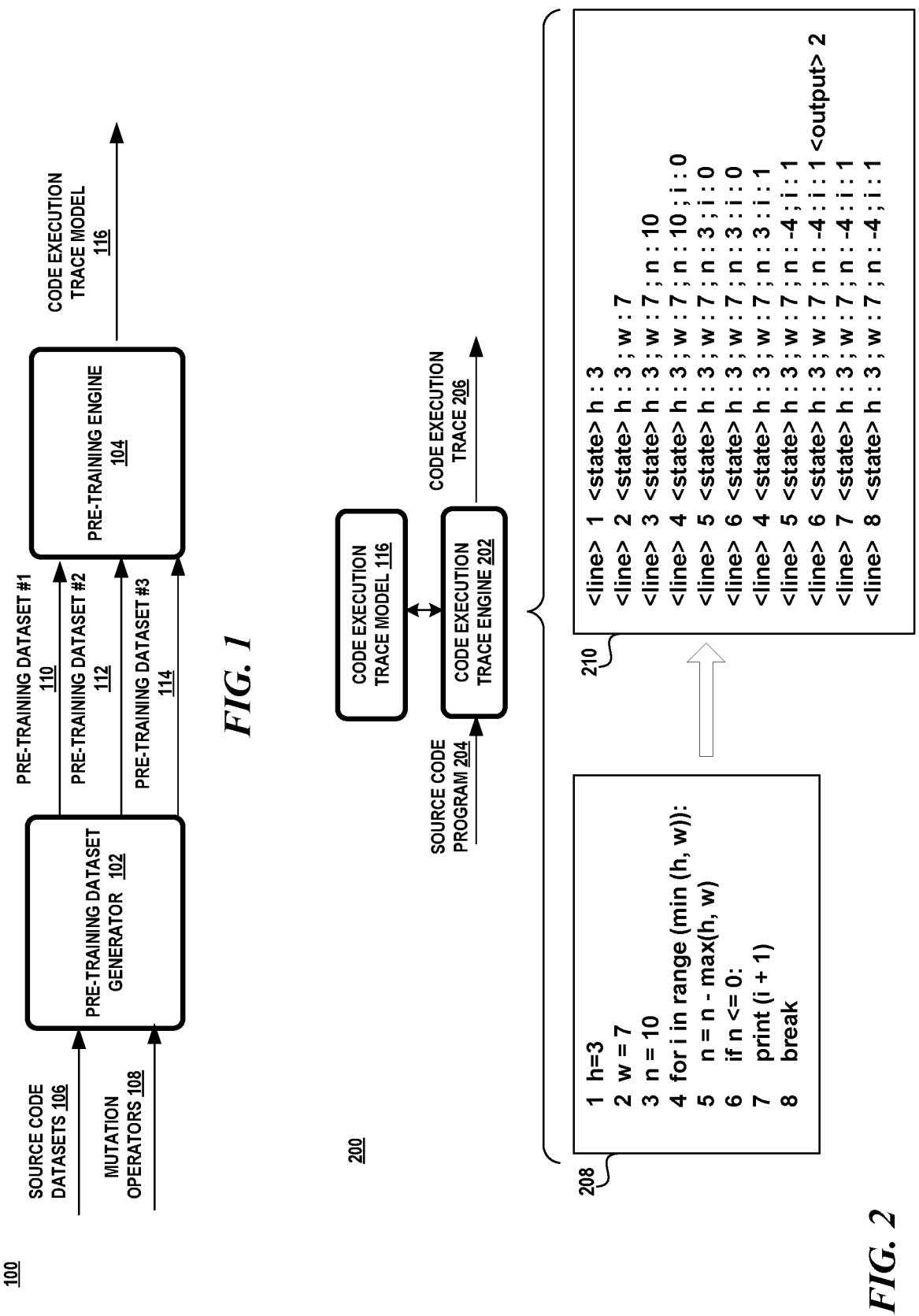

CODE EXECUTION TRACE GENERATION WITH PRE-TRAINED LARGE LANGUAGE MODEL

BACKGROUND

A code execution trace is a snapshot of the state of a program during its execution. The code execution trace is used to understand the dynamic behavior of the program reflecting the control flow of the program and the state changes of the variables. The code execution trace is often used to debug the program and to identify performance issues.

A code execution trace may be obtained by instrumenting the program with trace statements at strategic locations. When the instrumented statements are executed, a log is output which records events that occurred during execution of the program. The code execution trace may be implemented using tracing tools, such as the Event Tracing for Windows (ETW) tool, which provides a mechanism to trace and log events that are raised by user applications and kernel drivers.

Alternatively, a debugger may be used to generate a code execution trace. A developer inserts breakpoints into a program at strategic locations. During execution of the program, the program is paused at the breakpoint to allow the developer to observe the state of the program.

However, both of these techniques require the program to be executed in order to obtain a code execution trace and for the program to be instrumented which may not be possible in all scenarios.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A large language model is pre-trained using curriculum learning to learn to predict a code execution trace of a given source code program without executing the program. The code execution trace contains the line order in which a computer executes the program statements and the intermediate states of the program's execution. Curriculum learning for the large language model starts with simple source code samples having a single line of execution and then progresses the learning to harder source code programs with more complex operations.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 1 is a schematic diagram illustrating an exemplary code execution trace system for generating pre-training datasets to train a large language model for code execution trace prediction.

FIG. 2 is a schematic diagram illustrating an exemplary inference system that utilizes the code execution trace model to predict a code execution trace for a given source code program.

DETAILED DESCRIPTION

Overview

Figure 3:
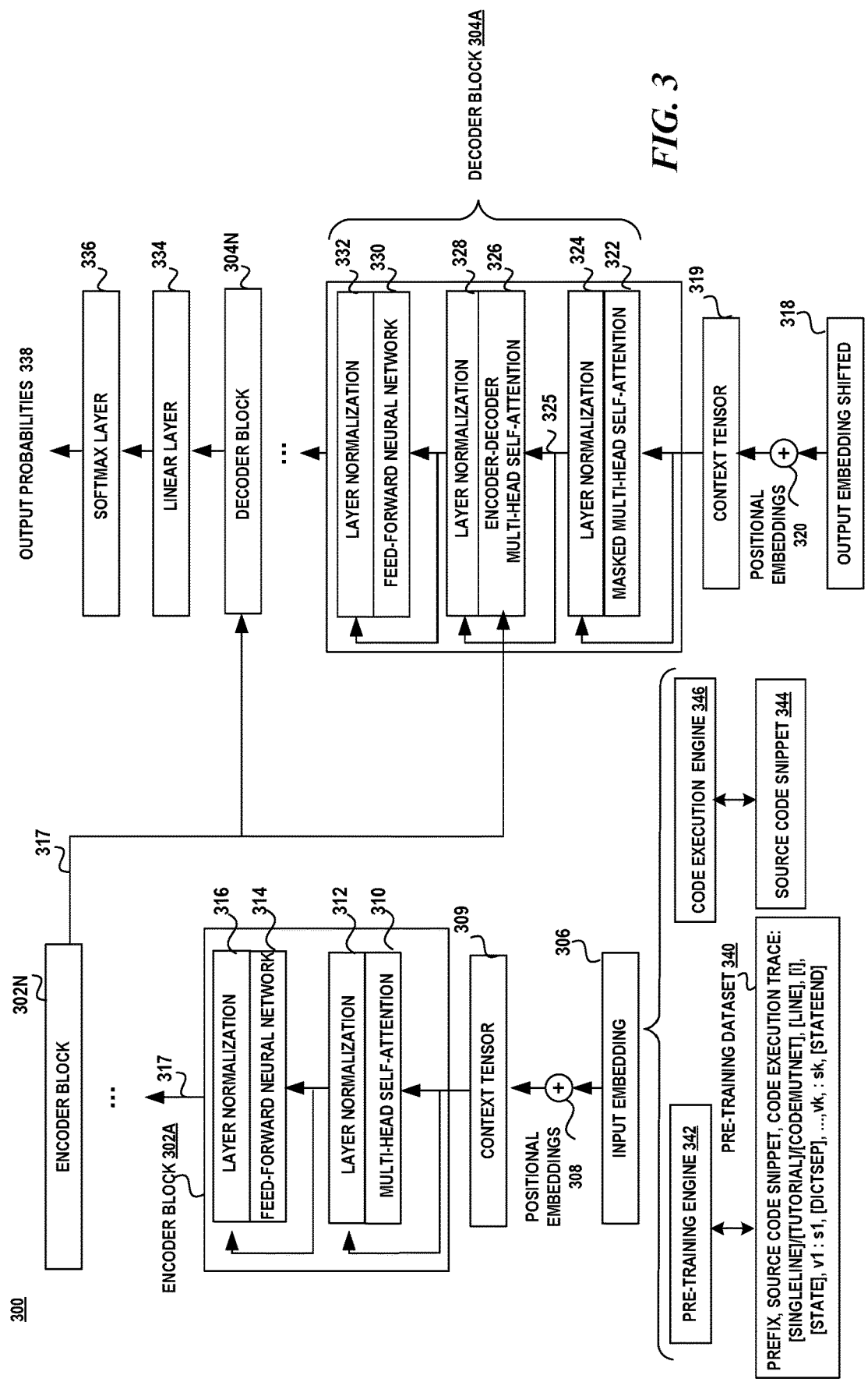
FIG. 3 is a flow diagram illustrating an exemplary configuration of a large language model as a unified cross-modal neural transformer model with attention.

Aspects of the present disclosure pertain to the pre-training of a large language model to learn to predict a code execution trace of a given source code program without executing the program. Aspects of the present disclosure pertain to the use of the pre-trained large language models to generate a code execution trace for a given source code snippet. In an aspect, the code execution trace contains the line order in which a computer executes the program statements and the intermediate states of the execution of the program. The intermediate states include the variable changes from one statement to a following statement.

The large language model is pre-trained using curriculum learning. Curriculum learning is a learning process in which knowledge is accumulated over time. Curriculum learning for the large language model starts with simple source code samples having a single line of execution and then gradually learns from harder source code programs with more complex operations. In an aspect, the curriculum learning consists of a three-stage learning process where the model is pre-trained first on pairs consisting of a single-line source code sample and its associated execution trace, then on pairs consisting of a multi-line source code sample and its associated execution trace, and lastly on pairs consisting of a highly-complex source code sample and its associated execution trace.

The code statements inside a program are not executed sequentially and variables relate to various types of data structures with diverse characteristics and operations. This behavior needs to be captured in the pre-training of the model which dictates the need for a large-scale dataset. For this reason, obtaining such a large-scale dataset for a programming language from publicly-available software platforms is challenging. Publicly-available platforms, such as GitHub or StackOverflow, are not executable at scale since they depend on external resources that are not readily available. To compensate for this issue, a large-scale pre-training dataset is created using a mutation-based data augmentation technique to created additional training samples.

Once the model is trained and validated, the model is used in an inference system to predict one or more code execution trace candidates for a program without executing the program. The code execution trace candidates predicted by the model may then be used to debug the execution of the program and verify the results of other tasks.

Attention now turns to a more detailed description of the system, components, methods and techniques used to pre-train a large language model to predict a code execution trace and the use of the model in inference systems.

The system, components, methods and techniques described herein are disclosed with respect to source code written in the Python programming language. However, it should be noted that the system, components, methods and techniques described herein are not limited to the Python programming language and that other programming languages or combinations of programming languages may be utilized.

System

FIG. 1 illustrates a block diagram of an exemplary system 100 for pre-training a large language model to predict a code execution trace given a source code snippet. The system 100 includes a pre-training dataset generator 102 and a pre-training engine 104. The pre-training dataset generator 102 receives source code from various source code datasets 106 and a list of mutation operators 108 to produce multiple pre-training datasets 110, 112, 114. The list of mutation operators 108 describe the operations used to mutate source code to produce additional source code samples. The pre-training engine 104 uses the pre-training datasets 110, 112, 114 to train a code execution trace model 116 to learn to predict a code execution trace given a source code snippet (e.g., program, method, code fragment).

In an aspect, the source code datasets of samples are obtained from publicly available sources known to have quality source code samples. The initial pre-training dataset, pre-training dataset #1 110, contains simple lines of code, such as a single line of execution. The following pre-training dataset, pre-training dataset #2 112, contains more complex code execution and the last pre-training dataset, pre-training dataset #3 114, contains highly-complex code execution.

In an aspect, pre-training dataset #1 110 includes source code samples from the Python SingleLine dataset of Fraser Greenlee. This dataset includes nine million Python source code samples of single line executions. Each sample from the SingleLine dataset includes several variables specified in initial values, a single line of Python code, and a new set of variables and values resulting from execution of the single line of Python code. The single line of Python code and the initial values are used as the input source code and the new set of variables and values resulting from execution of the single line of Python code is considered the code execution trace.

Pre-training dataset #2 comes from the Python Software Foundation which includes source code samples having multiple lines of code executions from tutorials of the Python programming language. Pre-training dataset #3 comes from Project CodeNet. Project CodeNet is a large-scale dataset from IBM with approximately 14 million code samples, each of which is an intended solution to one of 4000 coding problems. The code samples from Project CodeNet come from submissions to competitive programming competitions and include complex code operations.

The mutation operators 108 are a set of operations that are applied to the Python source code to generate a mutable sample. The mutation operators 108 may include any one or more of the following operators: Constant Replacement—changes numeric and string literals; Arithmetic Operator Deletion—deletes a unary arithmetic operator '+' or '−'; Arithmetic Operator Replacement—replaces an arithmetic operator with another one. For example, x*y can be mutated to x/y; Break Continue Replacement—swap keywords break and continue in a loop body; Conditional Operator Deletion—delete unary negation operator not or the negation of a membership operator not in; Logical Connector Replacement—swap logical operators and with or and vice versa; Relational Operator Replacement—substitutes relational operators. For example, x<=y can be mutated to x>y; Slice Index Removal—delete one argument of collection[start:end:step]; One Iteration Loop—execute a loop only once by adding a break statement; Reverse Iteration Loop—change direction of loop iteration by the function reversed ( ); and Zero Iteration Loop—interrupt realization of a loop during its first iteration.

In an aspect, the pre-training dataset generator 102 and the pre-training engine 104 may be a sequence of computer program instructions, that when executed by a processor, causes the processor to perform methods and/or operations in accordance with a prescribed task. The pre-training dataset generator 102 and the pre-training engine 104 may be implemented as program code, programs, procedures, module, code segments, program stacks, middleware, firmware, methods, routines, and so on. These executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

FIG. 2 illustrates a block diagram of an exemplary inference system 200 that utilizes the code execution trace model to predict a code execution trace given a source code snippet. The inference system 200 includes a code execution engine 202 that receives a source code program 204 for which the code execution engine 202 utilizes the code execution trace model 116 to predict a code execution trace of the source code program.

FIG. 2 shows an exemplary input to the engine 208 and an expected output 210. The source code snippet 208 contains eight numbered lines of Python source code. An exemplary code execution trace is output by the code execution trace engine 202 having the following format:

<line> line number <state> variable$_1$: variable$_1$ value; variable$_n$: variable n value; <output> output value.

As shown in FIG. 2, the execution of each line of Python code 208 has one or more corresponding lines in the code execution trace 210. The code execution trace includes the order in which the computer executes the statements and the states of the variables. For example, in the exemplary source code snippet 208, lines 4-6 are repeated in a loop (lines 4-7) and there are corresponding lines in the code execution trace for each iteration of lines 4-6.

In one aspect, the code execution engine 208 and the code execution trace model 116 may be part of an Integrated Development Environment (IDE), source code editor or software development tool to assist a developer in learning how a source code snippet would be executed. The IDE, source code editor or software development tool would provide the code execution engine a source code snippet and a corresponding code execution trace is predicted. The developer uses the code execution trace to debug the source code snippet and learn from the execution trace how to improve the program.

In other aspects, the model may be used as a type of supervision signal. During training, the model is penalized if it generates code that leads to incorrect execution outcomes. In the inference setting, it is possible to conduct the majority vote on the execution results among the generated programs, and select the most-voted execution result as opposed to choosing the maximum likelihood prediction In other aspects, the model may be used for execution-based verification of the results generated by large language models. The model is used as a reranker for tasks such as zero-shot code-to-code search and text-to-code generation. For zero-shot code-to-code search, a large language model gets the top-N similar code snippets as a requested code snippet. The execution results between the requested code snippet and the top-N similar code snippets are reranked according to the code execution traces produced by the code execution trace model. This produces more accurate top-N results. For a text-to-code generation task, a large language model is used to generate N candidates. The code execution trace model is then executed to rerank the N candidates by the code execution traces.

Large Language Model

A large language model is a deep machine learning model that contains millions and more parameters. Parameters are the parts of the model learned from the training datasets that define the skill of the model to generate predictions for a target task.

A deep machine learning model differs from traditional machine learning models that do not use neural networks. Machine learning pertains to the use and development of computer systems that are able to learn and adapt without following explicit instructions, by using algorithms and statistical models to analyze and draw inferences from patterns in data. Machine learning uses different types of statistical methods to learn from data and to predict future decisions. Traditional machine learning includes statistical techniques, data mining, Bayesian networks, Markov models, clustering, support vector machine, and visual data mapping.

Deep machine learning differs from traditional machine learning since it uses multiple stages of data processing through many hidden layers of a neural network to learn and interpret the features and the relationships between the features. Deep machine learning embodies neural networks which differs from the traditional machine learning techniques that do not use neural networks. There are various types of deep machine learning models that generate source code, such as recurrent neural network (RNN) models, convolutional neural network (CNN) models, long short-term memory (LSTM) models, and neural transformers with attention.

Pre-training is the process where the model's parameters (e.g., embeddings, weights, biases) are learned from unsupervised data. The model learns the parameters through the optimization of the cost function used by the neural network layer of the model. The cost function determines the error loss from the previous epoch which is then backpropagated to the preceding layers of the model. The model's parameters are updated through backpropagation based on the error loss determined by the cost function.

The optimization of the cost function used in the neural network layer of the model determines the error loss from the previous epoch which is then backpropagated to the preceding layers of the model. The model's parameters are updated through backpropagation based on the error loss determined by the cost function. Once the model is fully trained, the model's embeddings are stored in a separate data structure and used in the inference process to transform an input sequence of tokens into a sequence of input embeddings. Each token in an input sequence is converted into its corresponding embedding resulting in the sequence of input embeddings that is applied to the model.

Fine-tuning is the process where the model's parameters are learned or updated from supervised data. Pre-training and fine-tuning are both training processes but differ in the type of training data used. A supervised dataset contains labeled data that is tagged with the correct answer, whereas an unsupervised dataset learning uses unlabeled data.

In an aspect, the large language model is a unified cross-modal neural transformer model with attention. A unified cross-modal neural transformer model with attention is a type of neural transformer model that is pre-trained on multi-modal contents (i.e., code comments and abstract syntax tree (AST) representations of source code), to support various code-related tasks.

FIG. 3 shows an exemplary structure of the unified cross-model neural transformer model with attention in an encoder-decoder configuration. The neural transformer model 300 contains one or more encoder blocks 302A-302N ("302") and one or more decoder blocks 304A-304N ("304"). The initial inputs to an encoder block 302 are the input embeddings 306 of an input sequence of the pre-training dataset. In order to retain the order of the tokens in the input sequence, positional embeddings 308 are added to the input embedding 306 forming a context tensor 309. The initial inputs to the first decoder block 304A are a <START> token. Thereafter, the inputs to the first decoder block 304A are the shifted sequence of the output embeddings 318 from the previous time step to which the positional embeddings 320 are added forming context tensor 319.

An encoder block 302 consists of two layers. The first layer includes a multi-head self-attention component 310 followed by layer normalization component 312. The second layer includes a feed-forward neural network 314 followed by a layer normalization component 316. The context tensor 309 is input into the multi-head self-attention layer 310 of the encoder block 302 with a residual connection to layer normalization 312. The output of the layer normalization 312 is input to the feed-forward neural network 314 with another residual connection to layer normalization 316. The output of the encoder block 302 is a set of hidden representations 317. The set of hidden representations 317 is then sent through additional encoder blocks, if multiple encoder blocks exist, or to the decoder 304.

Attention is used to decide which parts of the input sequence are important for each token, especially when decoding long sequences since the encoder is limited to encoding a fixed-size vector. Attention mechanisms gather information about the relevant context of a given token and then encode that context into a vector which represents the token. It is used to identity the relationships between tokens in the long sequence while ignoring other tokens that do not have much bearing on a given prediction.

The multi-head self-attention component 310 takes a context tensor 309 and weighs the relevance of each token represented in the context tensor to each other by generating attention weights for each token in the input embedding 306. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token in a sequence, K is the vector representations of all tokens in the sequence, and V is the vector representations of all the tokens in the sequence.

The queries, keys and values are linearly projected h times in parallel with $d_v$ output values which are concatenated to a final value:

MultiHead(Q, K, V)=Concat(head$_1$, . . . , head$_h$) $W^O$,
where head$_i$=Attention($QW_i^Q$, $KW_i^K$, $VW_i^V$),
with parameter matrices $W_i^Q \in \mathbb{R}^{d_{model} \times d_k}$, $W_i^V \in \mathbb{R}^{d_{model} \times d_k}$, $W_i^V \in \mathbb{R}^{d_{model} \times d_k}$, and $W^O \in \mathbb{R}^{hd_v \times d_{model}}$.

In order to reduce the training time of the neural transformer, layer normalization is used between the layers. The layer normalization component normalizes the inputs across the features. The mean and standard deviation is computed across the feature dimensions. There is a first layer normalization 312 that precedes the feed-forward neural network 314 and a second layer normalization 316 that follows the feed-forward neural network 314.

The feed-forward neural network 314 processes each output encoding separately. The output of the top encoder block is a set of attention vectors K and V 317 which is used by the encoder-decoder multi-head self-attention layer 326 of each decoder block 204.

The stack of decoder blocks 304 predicts each token $t_i$ in the target language one-by-one at each time step conditioned on all previously-generated target tokens $t_1, \ldots, t_{i-1}$. A decoder block 304 consists of three layers. The first layer includes a masked multi-head self-attention component 322 followed by a layer normalization component 324. The output of the layer normalization component 324 is input into the encoder-decoder multi-head self-attention component 326 with a residual connection to layer normalization component 328. The second layer includes an encoder-decoder multi-head self-attention component 326 followed by a layer normalization component 328. The output of layer normalization component 328 is input into the feed-forward neural network 330 with a residual connection to layer normalization component 332. The third layer includes a feed-forward neural network 330 followed by a layer normalization component 332.

The masked multi-head self-attention component 322 receives the output embeddings of the previous timestep. The masked multi-head self-attention component 322 masks the output embeddings from future time steps. The encoder-decoder multi-head self-attention layer 326 receives queries from the previous decoder layer 325 and the memory keys and values 317 from the output of the encoder block 302. In this manner, the decoder block 304 can attend to every position of the input sequence. The feed-forward neural network 330 processes each output encoding separately. A layer normalization component 324, 328, 332 is used between the layers in order to normalizes the inputs across the features.

The linear layer 334 projects the vector produced by the stack of decoders into a logits vector. The softmax layer 336 then turns the scores of the logits vector into probabilities for each token in the model's vocabulary which are positive and normalized.

In one aspect, the neural transformer model contains a stack of N encoder blocks and a stack of N decoder blocks. The output of each encoder block is passed onto the next encoder block and processed. Each decoder block receives the attention weights computed from the last encoder block. The use of multiple stacked encoder blocks and decoder blocks increases the model's capacity allowing the model to learn increasing levels of abstraction.

During pre-training of the model for the code execution trace generation task, the pre-training engine 342 applies the pre-training dataset 340 to the model. The pre-training dataset 340 contains pairs of source code samples with a corresponding execution trace. The input sequence includes a prefix that identifies the complexity level of the pre-training dataset, such as SingleLine, Tutorial, or CodeNetMut, a representation of the source code snippet, and a representation of the corresponding code execution trace. The representation of the source code snippet includes token embeddings for each token of the source code snippet. The representation of the code execution trace contain the following format: [LINE], [i], [STATE], $v_1$: $s_1$ [DICTSEP], . . . , [DICTSEP], $v_k$: $s_k$ [STATEEND], where [LINE], [STATE], [DICTSEP], [STATEEND] are special tokens that represent a line [LINE], a state [STATE], end of a state [STATEEND], separation of each pair [DICTSEP]; where k denotes the number of variables, and the state of the k-th variable is represented as $s_k$.

At inference, the code execution trace engine 346 transforms the given source code snippet 344 into token embeddings which are input into the model.

Methods

Attention now turns to a more detailed description of the methods used in the code execution trace system. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
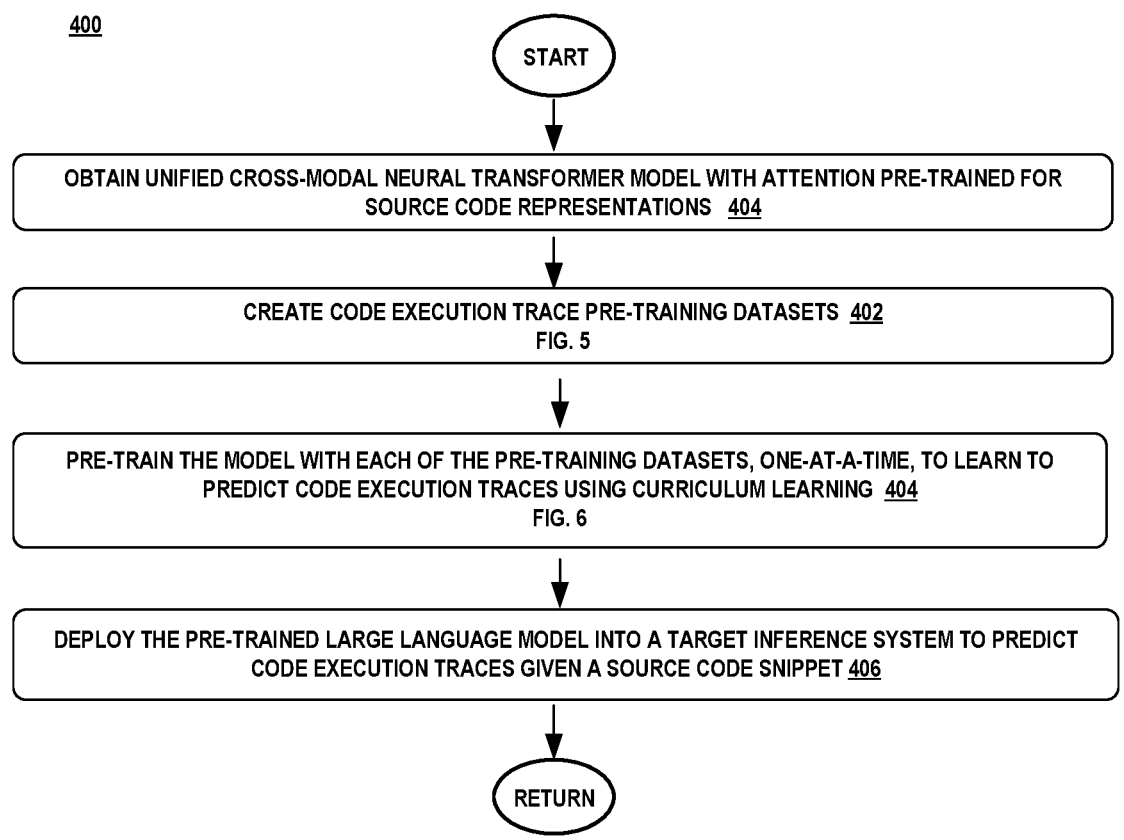
FIG. 4 is a flow chart of an exemplary method of the code execution trace system.

FIG. 4 is an exemplary method of the code execution trace system 400. A large language model is obtained to pre-train for the code execution trace task (block 402). In an aspect, the language the model is a unified cross-modal neural transformer model with attention having been previously pre-trained for source code representations (block 402).

The unified cross-modal neural transformer model with attention is pre-trained on source code comments and an abstract syntax tree (AST) representation of source code (i.e., cross-model content). The source code comments provide semantic information about the source code since the comments typically describe the various portions of the source code program. The AST representation of the source code contains rich syntax information such as the types of statements and the nested relationship among the statements which helps to better understand source code.

The unified cross-modal neural transformer model with attention utilizes mask attention matrices with prefix adapters to control the behavior of the model. The prefix adapters include [Enc] to indicate that the model works as an encoder only (i.e., encoder mode), [Dec] to indicate that the model works as a decoder only (i.e., decoder mode), and [E2D] which indicates that the model works as an encoder-decoder (i.e., encoder-decoder mode).

The prefix is used to control the attention of the multi-head self-attention layer. The output of the multi-head self-attention layer are the queries Q, keys K and values V computed as follows: $Q=H^{l-1}W^Q$, $K=H^{l-1}W^K$, $V=H^{l-1}W^V$.

The output of each head is:

$$\text{softmax}\left(\frac{QK^T}{\sqrt{d_k}} + M\right)V,$$

where $d_k$ is the dimension of a head, and $M \in \mathbb{R}^{n \times n}$ is a mask matrix to control the context a token can attend to when $\mathbb{R}$computing its contextual representation. The [Enc] prefix adapter sets all the elements of the mask matrix as 0 to allow all tokens to attend to each other. The [Dec] prefix sets the upper triangular part of the mask matrix to $-\infty$ to indicate that each token can attend to itself and previous tokens. The [E2D] prefix allows tokens in the source input to attend to each other while tokens in the target input only attend to itself and previous tokens in both source and target inputs.

The unified cross-modal neural transformer model with attention is pre-trained on three types of language modeling tasks: masked language modeling; unidirectional language modeling; and a denoising objective. In masked language modeling, a portion of the tokens from an input sequence are replaced with a mask allowing the model learn to predict the original tokens of the masked tokens based on the bidirectional contextual tokens.

In unidirectional language modeling, the model predicts the next token of an input sequence conditioned on the previous tokens and itself which is controlled by using a triangular matrix for the attention mask. The denoising objective randomly masks span of tokens of the input sequence of an arbitrary length.

It should be noted that the unified cross-modal neural transformer model with attention maybe generated as described above if not readily available.

The pre-training datasets for the code execution trace generation task are then created (block 402). In an aspect, three pre-training datasets are generated where each pre-training dataset contains source code samples of a different level of code complexity starting from single-line code executions, to multiline code executions, to complex code executions.

Figure 5:
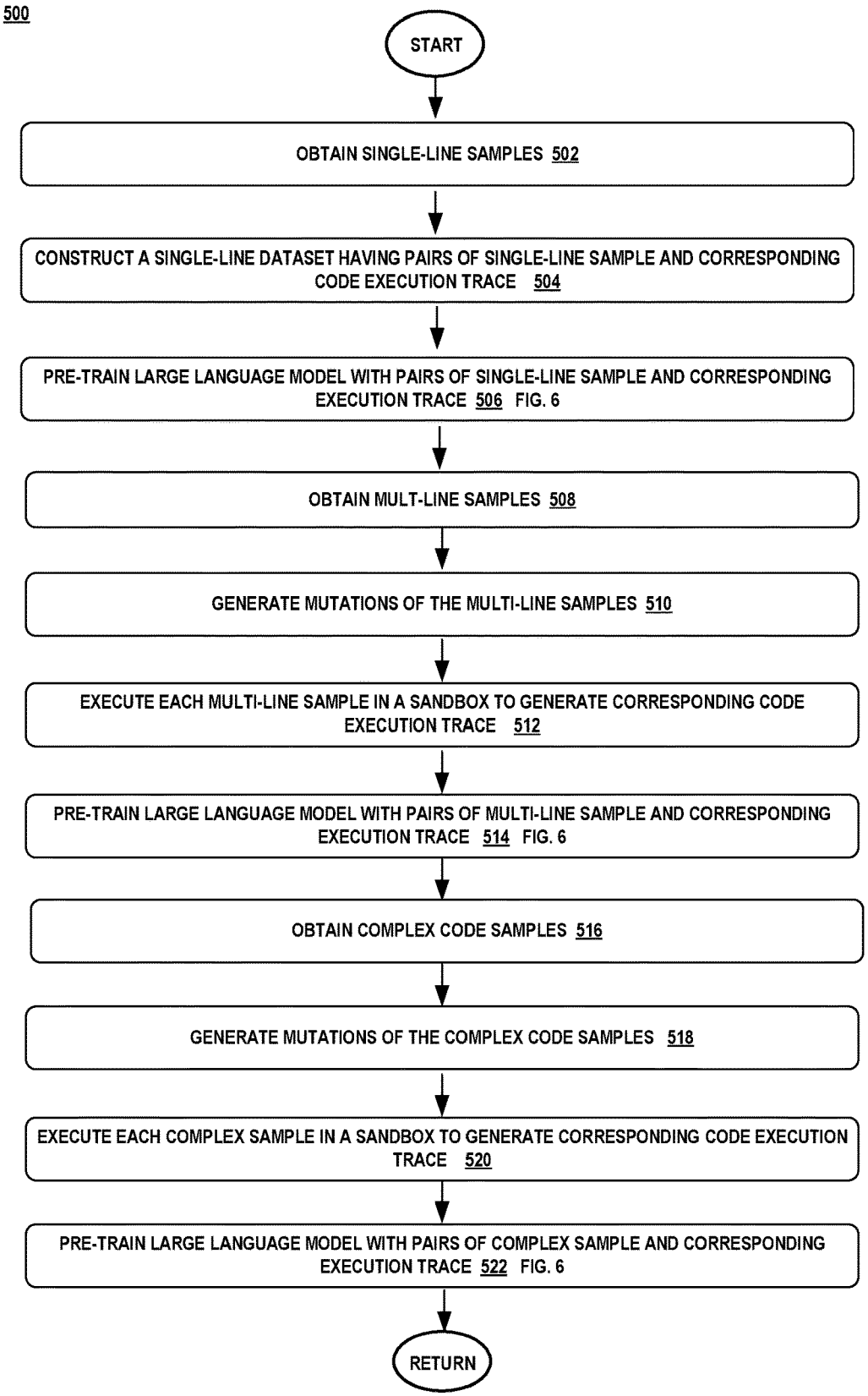
FIG. 5 is a flow chart of an exemplary method for creating the pre-training datasets for curriculum learning.

Turning to FIG. 5, there is an exemplary method 500 for generating the various pre-training datasets. Single-line code samples are obtained to construct the single-line pre-training dataset (block 502). In an aspect, the single-line code samples contain several variables specified in initial values, a single line of Python code and the new set of variables and values resulting from executing the single line of Python code. The variables specified in the initial values and the single line of Python code are considered the input sequence and the values resulting from executing the single line of Python code is considered the code execution trace.

The single-line pre-training dataset is constructed consisting of input sequences that include the initial values and single line of Python code and its corresponding code execution trace (block 504). The unified cross-modal neural transformer model with attention is then pre-trained with the single-line pre-training dataset (block 506).

Multi-line source code samples are obtained to construct the multi-line pre-training dataset (block 508). In an aspect, the multi-line pre-training dataset is created by crawling and filtering the executable code that appears in the official Python tutorial website. These samples introduce the basic concepts and features of the Python programming language. To generate additional samples, various mutation operations are applied to the samples (block 510). For example, the Constant Replacement operator of the mutation dataset is used to change literals into diverse values.

Each of the multi-line samples is executed in a sandbox to generate its corresponding code execution trace (block 512). A sandbox is an isolated execution environment that separates the execution of the code from other processes running in the computer. The multi-line pre-training dataset is then constructed from pairs of the samples and their corresponding code execution trace. The multi-line pre-training dataset is then used to train the large language model (block 514).

In an aspect, source code samples are created for the complex pre-training dataset from submissions to the competitive programming problems from Project CodeNet (block 516). Mutations of the samples are also generated using one or more of the mutation operators (block 518). In an aspect, a tool, such as the tree-sitter program, is used to convert each program into an abstract syntax tree from which node type information is extracted. From the node type information, a list of mutable literals, operators and statements are obtained. One or more mutation operators are applied to the mutable literals, operators and statements to generate additional complex samples.

Each source code sample is executed in a sandbox to generate a corresponding code execution trace (block 520). A complex pre-training dataset is then generated consisting of pairs of a source code sample and its corresponding code execution trace (block 520). The complex pre-training dataset is then applied to the large language model to pre-train the model to learn to predict a code execution trace (block 522).

Training

Figure 6:
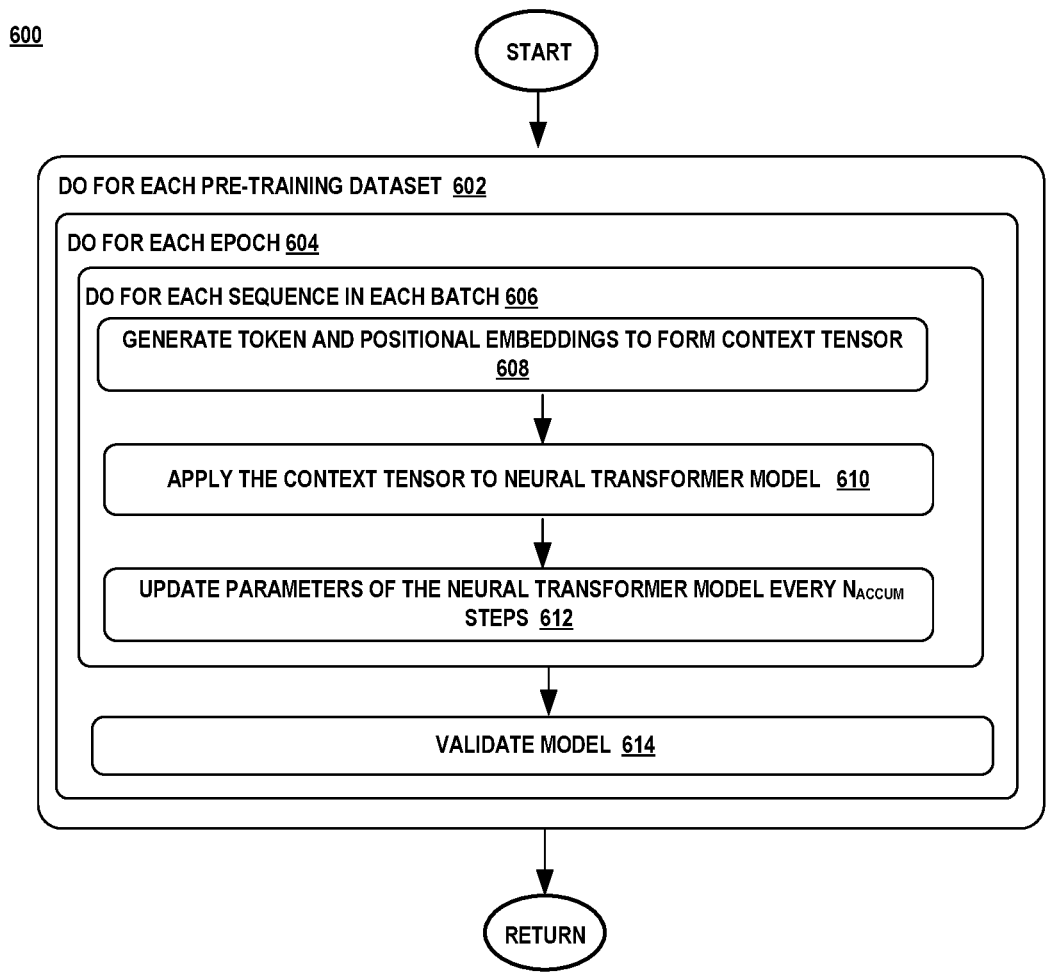
FIG. 6 is a flow chart of an exemplary method for applying the pre-training datasets to pre-train the large language model to predict code execution traces.

FIG. 6 illustrates an exemplary method 600 for training the large language model with the pre-training datasets.

Each of the pre-training samples of a pre-training dataset is an input sequence that is transformed into a sequence of input embeddings. The input sequence is tokenized and each token in replaced with a respective embedding transforming the input sequence into a sequence of input embeddings. An embedding is a learned representation for the text-based tokens where tokens that have a common meaning have a common representation. An embedding is a mapping of discrete categorical variables to a vector of continuous numbers. There is an embedding for each token of the source code and natural language text of the code reviews used in the pre-training datasets. Each token embedding has a corresponding positional embedding. The neural transformer model does not read each token sequentially and as such, has no knowledge of the token's position in a sequence without additional position information. The positional embedding is used to encode position information about a token's position in a sequence into the neural transformer model.

Neural transformer models are trained iteratively, making multiple passes over the pre-training dataset before converging to a minimum. An epoch represents the entire pre-training dataset passed forwards and backwards through the neural transformer blocks once. Since the pre-training dataset is very large, it is partitioned into smaller batches. The training is iterative and the entire pre-training dataset is passed through the neural transformer in multiple iterations. Each training iteration includes forward propagation, loss calculation, backpropagation steps followed by updating the weights. The training dataset is partitioned into batches with each batch of sequences running through the pre-training process.

Neural transformer models are trained iteratively, making multiple passes over the pre-training dataset before converging to a minimum. An epoch represents the entire pre-training dataset passed forwards and backwards through the neural transformer blocks once. Since the pre-training dataset is very large, it is partitioned into smaller batches. The training is iterative and the entire pre-training dataset is passed through the neural transformer in multiple iterations. Each training iteration includes forward propagation, loss calculation, backpropagation steps followed by updating the weights. The training dataset is partitioned into batches with each batch of sequences running through the pre-training process.

The neural transformer model has multiple blocks and layers so that more detailed relationships within the data is learned as well as how the features interact with each other on a non-linear level. The model architecture, training procedure, data normalization and vocabulary encoding procedures are hyperparameters that are tailored to meet a particular objective. The values of the hyperparameters influence how the parameters are learned.

Referring to FIGS. 3 and 6, for each input sequence of each batch in each epoch (blocks 602, 604), the T-ordered sequences of tokens are then mapped into numeric vectors and then into respective token embeddings and positional embeddings, where T is the length of the input sequence (block 606).

Initial values are generated for the token embedding and positional embeddings of each input sequence which are then used to form a context tensor. Thereafter, the neural transformer model learns the values for each embedding through backpropagation. Upon the completion of the training phase, the embeddings for each token and the positional embeddings are saved into respective matrices for later use. There is a token embedding matrix, We, that contains an embedding vector for each token $t_i$, i=0 . . . V of a particular programming language, and a positional embedding matrix, $W_p$, that contains an embedding vector $P_j$, j=0 . . . . T, for each position, where V is the size of the vocabulary for a particular programming language and T is the length of the token sequence. (Collectively, block 608).

The first encoder block 302A of the unified neural transformer model with attention 300 takes the context tensor 309 as input and passes it through the multiple layers of multi-head self-attention, layer normalization and feed-forward neural network to finally produce a set of hidden representations 317. If there are additional encoder blocks, the output of each encoder block is passed onto the next encoder block with the output of the last encoder block producing the last set of hidden representations 317. The last set of hidden representations 317 is passed onto each decoder block 304A-304N. (Collectively, block 610).

The first decoder block 304A of the pre-trained neural transformer model initially takes a <START> token and thereafter takes a shifted sequence of an output embedding as input. The masking in the masked multi-head self-attention layer is used to prevent positions from attending to subsequent positions in the future. The masking combined with the output embeddings shifted by one position ensures that the predictions to position T depend only on the known outputs at positions less than T. Starting with the first token of the output sequence, the tokens are passed through the self-attention and normalization layers and into the encoder-decoder attention layer, serving as the query for encoder-decoder attention, where the key and value pairs for the attention are the outputs of encoder. The encoder output was calculated with the entire input embedding sequence. (Collectively, block 610).

The feed-forward neural networks in the encoder blocks 302A-302N and the decoder blocks 304A-304N are trained iteratively, making multiple passes over the training dataset before converging to a minimum. Each training iteration includes forward propagation, loss calculation, and back-propagation steps followed by updating the weights by calculating the weight gradients. The loss function estimates the loss or error which is used to compare how good or bad the predicted results are. In one aspect, a cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 610).

At the completion of each batch, the parameters of the neural transformer model are updated at a preconfigured frequency denoted as Naccum. Naccum is a gradient accumulation frequency and in one aspect has a value of 8. The parameters include the token embeddings and the positional embeddings which are stored in a respective embedding matrix. (Collectively, block 612).

Next, the neural transformer model is validated. Before the neural transformer model is trained, a set of hyperparameters is selected randomly and then tuned to achieve a desired performance. The neural transformer model is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 614).

Figure 7:
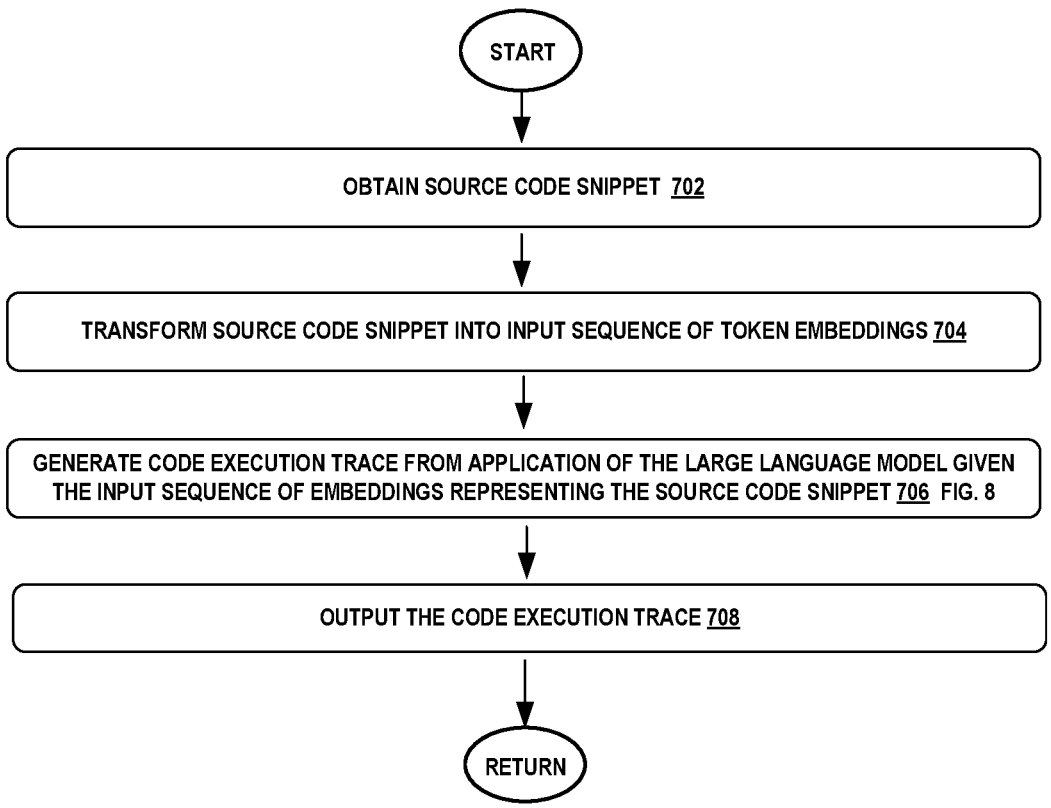
FIG. 7 is a flow chart of an exemplary method for utilizing the large language model for predicting a code execution trace.

Turning to FIG. 7, there is shown a method 700 of the inference process of the code execution trace system. The process starts with the code execution trace engine receiving a source code snippet (block 702). The code execution trace engine transforms the source code snippet into an input sequence of token embeddings (block 704) which are applied to the large language model to predict a code execution trace (block 706). One or more code execution trace candidates may be generated which are output (block 708).

Figure 8:
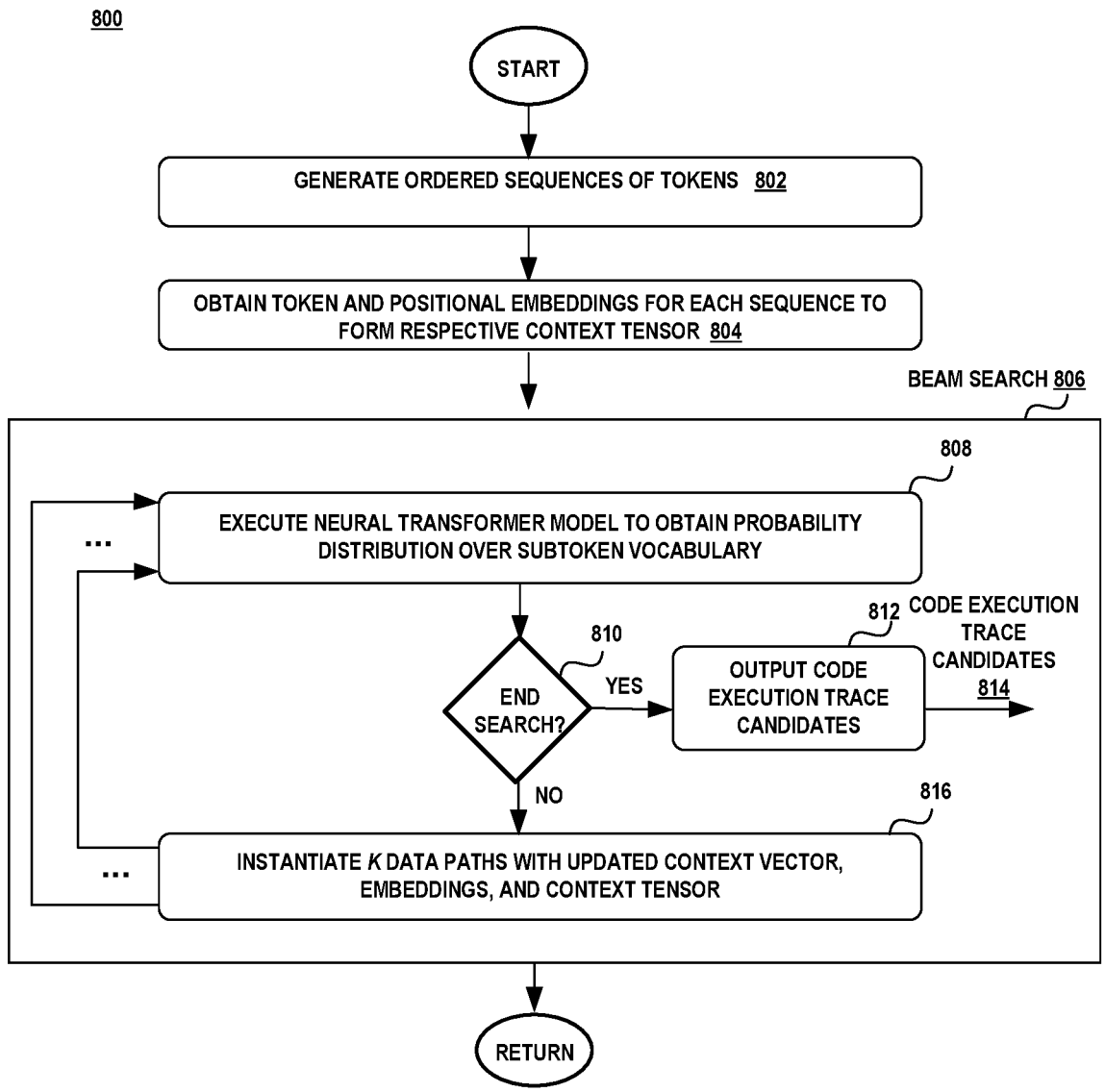
FIG. 8 is a flow chart of an exemplary method of a beam search used in the generation of code execution trace candidates.

Turning to FIG. 8, there is shown a process 800 for predicting code execution traces given a source code snippet. In an aspect, the code execution trace engine utilizes a beam search to generate the code execution trace candidates.

The model factorizes the probability of the target tokens in an input sequence into a product of conditional probabilities for each token using the formula: $p(t_1, tm|s) = \Pi_{i=1}^{m} p(t_i | t_1, \ldots, t_{i-1}, s)$. During inference, the calculation of the product of the conditional probabilities for each token is complex and extremely time consuming making the model difficult for real-time applications. Beam search is an approximation algorithm that performs faster.

The beam search uses the probability distribution generated by the neural transformer model to identify the top k tokens likely to be the next token in a code execution trace candidate. The beam search expands the search by instantiating new partial sequences using each of the selected tokens identified by the neural transformer model's probability distribution. The search continues generating new partial sequences from the top k tokens identified by the output distributions until the search ends. The search may end when the end-of-trace token appears as the most probable next token.

A beam search uses a breadth-first search to build a search tree. The search tree is composed of nodes at one or more inference levels. Each node represents a probability distribution generated by the neural transformer model for the tokens in the model vocabulary. At each level, only the top k tokens having the highest probabilities from the output distribution generated by the neural transformer model are expanded to the next inference level. The variable k is preconfigured and referred to as the beam width. Each of the k tokens is then expanded into a search that updates the current translation candidate sequence with the selected token to input into the neural transformer model to generate an additional probability distribution for the next token in a sequence. This process is repeated until the toss end-of-method token appears as the most probable next token or the maximum length threshold is exceeded.

A given source code sample is parsed into a concrete syntax tree and tokenized (block 802). Each sequence of tokens is transformed into a sequence of token and positional embeddings and then transformed into a context tensor (block 804).

The beam search 806 provides the model with the context tensor to generate a probability distribution for the token vocabulary at each decoder time step (block 808). If the probability distribution indicates that the next likely token is the end-of-trace token, then the beam search is finished (block 810—yes) and the method candidates 814 are output (block 812). Otherwise (block 810—no), the top k tokens to complete a partial sequence are selected (block 816).

Each of the selected tokens is then input in a respective context vector and has a separate data path through the neural transformer model again. The context vector utilizes the selected token in the current context vector with the last token removed. The new context vector will consist of T tokens with the selected token $t_o$ added to the beginning of the sequence with the last token removed from the sequence. If the current context vector consists of a token sequence consisting of $t_0, t_1, \ldots, t_T$, then the new context vector will consist of $t_k, t_0, t_1, \ldots, t_{T-1}$. (Collectively, block 816).

Technical Effect/Technical Improvement

Aspects of the subject matter disclosed herein pertain to the technical problem of predicting a code execution trace for a given source code snippet without executing the source code. The technical features associated with addressing this problem is the pre-training of a large language model using curriculum learning to learn to predict a code execution trace. The technical effect achieved is an increased accuracy of the predicted code execution trace without increasing the computational burden.

The training of a large language model, such as a neural transformer with attention, to perform the code execution trace predictions requires a large amount of data to achieve the accuracy needed to make predictions, especially on unseen data. The training thereby consumes a considerable amount of computing resources and time. The inference phase of the code execution trace system has to perform within tight timing requirements in order to be viable in a target system. For at least these reasons, the training and inference performed by the code execution trace model needs to be performed on a computing device. The operations performed are inherently digital. A human mind cannot interface directly with a CPU, or network interface card, or other processor, or with RAM or digital storage, to read and write the necessary data and perform the necessary operations and processing steps taught herein.

Embodiments are also presumed to be capable of operating "at scale", that is capable of handling larger volumes, in production environments or in testing labs for production environments as opposed to being mere thought experiments.

The technique described herein is a technical improvement over prior solutions that required the execution of a program in order to produce a code execution trace and which required instrumentation into the program to generate the code execution trace. The technique described produces a code execution trace without executing the program or instrumenting the program.

In addition, the technique pre-trains existing models tailored for source code tasks rather than incurring the expensive fine-tuning process. By pre-training the model on several pre-training tasks, the model is able to learn the code semantics resulting in better code understanding and generation abilities. Code execution trace prediction requires the model to fully understand the code semantics which is learned by pre-training on masked language modeling, uni-directional language modeling, and with a denoising objective. The model is able to share parameters learned from a variety of source code tasks to the code execution trace predictions. The pre-training on these different tasks provides an enhanced accuracy in its predictions.

Exemplary Operating Environment

Figure 9:
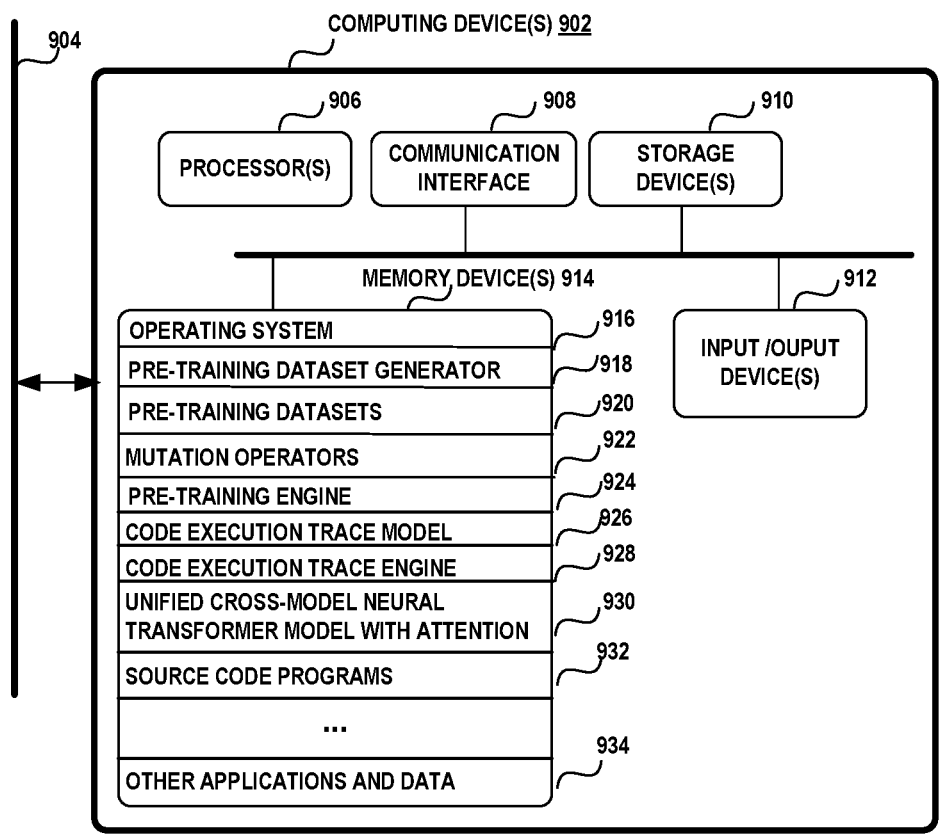
FIG. 9 is a block diagram illustrating an exemplary operating environment.

Attention now turns to a discussion of an exemplary operating environment 900. FIG. 9 illustrates an exemplary operating environment 900 in which one or more client computing devices 902 communicate with one or more computing devices. However, it should be noted that the aspects disclosed herein is not constrained to any particular configuration of the computing devices.

A computing device 902 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 900 may be configured in a network environment, a distributed environment, a multi-processor environment, or a stand-alone computing device having access to remote or local storage devices.

A computing device 902 may include one or more processors 906, one or more communication interfaces 908, one or more storage devices 910, one or more memory devices or memories 914, and one or more input/output devices 912. A processor 906 may be any commercially available or customized processor and may include dual microprocessors and multi-processor architectures. A communication interface 908 facilitates wired or wireless communications between the computing devices and with other devices. A storage device 910 may be computer-readable medium that does not contain propagating signals, such as modulated data signals transmitted through a carrier wave. Examples of a storage device 910 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 910 in a computing device 902. The input/output devices 912 may include a keyboard, mouse, pen, voice input device, touch input device, display, speakers, printers, etc., and any combination thereof.

A memory device or memory 914 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 914 may also include one or more external storage devices or remotely located storage devices that do not pertain to propagated signals, such as modulated data signals transmitted through a carrier wave.

A memory device 914 may contain instructions, components, and data. A component is a software program that performs a specific function and is otherwise known as a module, program, and/or application. Memory device 914 includes an operating system 916, pre-training dataset generator 918, pre-training datasets 920, mutation operators 922, pre-training engine 924, code execution trace model 926, code execution trace engine 928, unified cross-modal neural transformer model with attention 930, source code programs 932, and other applications and data 934.

The computing devices 902 may be communicatively coupled via a network 904. The network 904 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 904 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra-Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclosed comprising one or more processors and a memory that stores one or more programs that are configured to be executed by the one or more processors. The one or more programs including instructions to perform actions that: obtain a large language model trained on source code; generate a first pre-training dataset including a first plurality of source code samples, each source code sample of the first plurality of source code samples paired with a corresponding code execution trace, wherein each of the source code samples of the first pre-training dataset having a single-line code execution, wherein the code execution trace represents dynamic behavior of the source code sample during execution of the source code sample; train the large language model to learn to predict a code execution trace with the first pre-training dataset; generate a second pre-training dataset including a second plurality of source code samples, each source code sample of the second plurality of source code samples paired with a corresponding code execution trace, wherein each of the source code samples of the second pre-training dataset having multiple-line code execution; and train the large language model to learn to predict a code execution trace with the second pre-training dataset.

In an aspect, the one or more programs include instructions to perform actions that: execute each of the source code samples of the second plurality of source code samples to generate a corresponding code execution trace. In an aspect, the one or more programs include instructions to perform actions that: generate a third pre-training dataset including a third plurality of source code samples, each source code sample of the third plurality of source code samples paired with a corresponding code execution trace, wherein each of the source code samples of the third pre-training dataset having a code complexity that exceeds code complexity of the source code samples of the first pre-training dataset and the second pre-training dataset; and train the large language model to learn to predict a code execution trace with the third pre-training dataset.

In an aspect, the one or more programs include instructions to perform actions that: execute each of the source code samples of the third plurality of source code samples to generate a corresponding code execution trace. In an aspect, the one or more programs include instructions to perform actions that: mutate operations of select ones of the source code samples of the third pre-training dataset to create additional source code samples for the third pre-training dataset; and train the large language model to learn to predict a code execution trace with the mutated source code samples and corresponding code execution trace.

In an aspect, the code execution trace comprises an order in which code statements are executed and variable state changes. In an aspect, the large language model is trained on source code comments in the source code samples. In an aspect, the large language model is a unified cross-modal neural transformer model with attention.

A method is disclosed comprising: collecting a first plurality of source code programs, wherein each of the source code programs of the first plurality of source code programs is associated with a low code complexity level; creating a first pre-training dataset comprising each of the plurality of source code programs of the first pre-training dataset with an associated code execution trace; training a neural transformer model with attention with the first pre-training dataset to learn to predict a code execution trace for a given target source code program; collecting a second plurality of source code programs, wherein each of the source code programs of the second plurality of source code programs is associated with a code complexity level that exceeds the low code complexity level; creating a second pre-training dataset comprising each of the plurality of source code programs of the second pre-training dataset with an associated code execution trace; and training the neural transformer model with attention with the second pre-training dataset to learn to predict a code execution trace for a given target source code program.

In an aspect, the computer-implemented method further comprises: collecting a third plurality of source code programs, wherein each of the source code programs of the third plurality of source code programs associated with a code complexity level that exceeds the code complexity level of the second plurality of source code programs; and training the neural transformer model with attention with the second pre-training dataset to learn to predict a code execution trace given a target source code program.

In an aspect, the computer-implemented method further comprises: mutating one or more operations or variables in select ones of the source code programs of the third plurality of source code programs; and training the neural transformer model with attention with the mutated source code programs to learn to predict a code execution trace given a target source code program.

In an aspect, the code execution trace comprises an order in which code statements are executed and variable state changes. In an aspect, the computer-implemented method further comprises: prior to training the neural transformer model with attention on the first pre-training dataset, pre-training the neural transformer model with attention on source code programs and source code comments.

In an aspect, the low code complexity level is associated with single line executions. In an aspect, the neural transformer model with attention is a unified cross-modal neural transformer model with attention.

A computer-implemented method is disclosed comprising: creating a plurality of pre-training datasets, a first subset of the plurality of pre-training datasets comprising pairs of source code samples having single-line executions with an associated code execution trace, a second subset of the plurality of pre-training datasets comprising pairs of source code samples having multiple-line executions with an associated code execution trace, a third subset of the plurality of pre-training datasets comprising pairs of source code samples having complex executions with an associated code execution trace; obtaining a large language model previously pretrained on a plurality of source code tasks; training the large language model with the first subset of the plurality of pre-training datasets; upon completion of the training of the large language model with the first subset of the plurality of pre-training datasets, training the large language model with the second subset of the plurality of pre-training datasets; and upon completion of the training of the large language model with the second subset of the plurality of pre-training datasets, training the large language model with the third subset of the plurality of pre-training datasets.

In an aspect, the computer-implemented method further comprises: executing the source code samples of the plurality of pre-training datasets to generate corresponding code execution traces. In an aspect, the computer-implemented method further comprises: mutating operations or variables in the source code samples of the plurality of pre-training datasets to generate additional source code samples. In an aspect, the large language model is trained on source code programs and comments in the source code programs. In an aspect, the plurality of source code tasks includes masked language modeling, unidirectional language modeling, and denoising objective modeling.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

What is claimed:

1. A system comprising:
one or more processors; and
a memory that stores one or more programs that are configured to be executed by the one or more processors, the one or more programs including instructions to perform actions that:
obtain a large language model trained on source code;
generate a first pre-training dataset including a first plurality of source code samples, each source code sample of the first plurality of source code samples paired with a corresponding code execution trace, wherein each of the source code samples of the first pre-training dataset having a single-line code execution, wherein the code execution trace represents dynamic behavior of the source code sample during execution of the source code sample;
train the large language model to learn to predict a code execution trace with the first pre-training dataset;
generate a second pre-training dataset including a second plurality of source code samples, each source code sample of the second plurality of source code samples paired with a corresponding code execution trace, wherein each of the source code samples of the second pre-training dataset having multiple-line code execution; and
train the large language model to learn to predict a code execution trace with the second pre-training dataset, wherein the large language model comprises a unified cross-modal neural transformer model with attention.

2. The system of claim 1, wherein the one or more programs include instructions to perform actions that:
execute each of the source code samples of the second plurality of source code samples to generate a corresponding code execution trace.

3. The system of claim 1, wherein the one or more programs include instructions to perform actions that:
generate a third pre-training dataset including a third plurality of source code samples, each source code sample of the third plurality of source code samples paired with a corresponding code execution trace, wherein each of the source code samples of the third pre-training dataset having a code complexity that exceeds code complexity of the source code samples of the first pre-training dataset and the second pre-training dataset; and
train the large language model to learn to predict a code execution trace with the third pre-training dataset.

4. The system of claim 3, wherein the one or more programs include instructions to perform actions that:
execute each of the source code samples of the third plurality of source code samples to generate a corresponding code execution trace.

5. The system of claim 3, wherein the one or more programs include instructions to perform actions that:
mutate operations of select ones of the source code samples of the third pre-training dataset to create additional source code samples for the third pre-training dataset; and
train the large language model to learn to predict a code execution trace with the additional source code samples and corresponding code execution trace.

6. The system of claim 1, wherein the code execution trace comprises an order in which code statements are executed and variable state changes.

7. The system of claim 1, wherein the large language model is trained on source code comments in the source code samples.

8. A computer-implemented method, comprising:
collecting a first plurality of source code programs, wherein each of the source code programs of the first plurality of source code programs is associated with a low code complexity level;
creating a first pre-training dataset comprising each of the plurality of source code programs of the first pre-training dataset with an associated code execution trace;
training a neural transformer model with attention with the first pre-training dataset to learn to predict a code execution trace for a given target source code program;
collecting a second plurality of source code programs, wherein each of the source code programs of the second plurality of source code programs is associated with a code complexity level that exceeds the low code complexity level;
creating a second pre-training dataset comprising each of the plurality of source code programs of the second pre-training dataset with an associated code execution trace; and
training the neural transformer model with attention with the second pre-training dataset to learn to predict a code execution trace for a given target source code program.

9. The computer-implemented method of claim 8, further comprising:
collecting a third plurality of source code programs, wherein each of the source code programs of the third plurality of source code programs are associated with a code complexity level that exceeds the code complexity level of the second plurality of source code programs; and
training the neural transformer model with attention with the second pre-training dataset to learn to predict a code execution trace given a target source code program.

10. The computer-implemented method of claim 9, further comprising:
mutating one or more operations or variables in select ones of the source code programs of the third plurality of source code programs; and
training the neural transformer model with attention with the mutated source code programs to learn to predict a code execution trace given a target source code program.

11. The computer-implemented method of claim 8, wherein the code execution trace comprises an order in which code statements are executed and variable state changes.

12. The computer-implemented method of claim 8, further comprising:
prior to training the neural transformer model with attention on the first pre-training dataset, pre-training the neural transformer model with attention on source code programs and source code comments.

13. The computer-implemented method of claim 8, wherein the low code complexity level is associated with single line executions.

14. The computer-implemented method of claim 8, wherein the neural transformer model with attention is a unified cross-modal neural transformer model with attention.

15. A computer-implemented method, comprising:
creating a plurality of pre-training datasets, a first subset of the plurality of pre-training datasets comprising pairs of source code samples having single-line executions with an associated code execution trace, a second subset of the plurality of pre-training datasets comprising pairs of source code samples having multiple-line executions with an associated code execution trace, a third subset of the plurality of pre-training datasets comprising pairs of source code samples having complex executions with an associated code execution trace;
executing the source code samples of the plurality of pre-training datasets to generate corresponding code execution traces;
obtaining a large language model previously pretrained on a plurality of source code tasks;
training the large language model with the first subset of the plurality of pre-training datasets to learn to generate a code execution trace;
upon completion of the training of the large language model with the first subset of the plurality of pre-training datasets, training the large language model with the second subset of the plurality of pre-training datasets; and
upon completion of the training of the large language model with the second subset of the plurality of pre-training datasets, training the large language model with the third subset of the plurality of pre-training datasets to learn to generate a code execution trace.

16. The computer-implemented method of claim 15, further comprising:
mutating operations or variables in the source code samples of the plurality of pre-training datasets to generate additional source code samples.

17. The computer-implemented method of claim 15, wherein the large language model is trained on source code programs and comments in the source code programs.

18. The computer-implemented method of claim 15, wherein the plurality of source code tasks includes masked language modeling, unidirectional language modeling, and denoising objective modeling.

* * * * *